United States Patent
Goldblatt et al.

(10) Patent No.: US 11,223,530 B2
(45) Date of Patent: Jan. 11, 2022

(54) NATURAL LANGUAGE PROCESSING IN MODELING OF NETWORK DEVICE CONFIGURATIONS

(71) Applicant: International Business Machines Corporation, Armonk, NY (US)

(72) Inventors: Ryan Goldblatt, Belfast (IE); Michael Maclynn, Belfast (IE); Keith Quinn, Newtonabby (IE); Stephen Thomas Kelly, Ballycarry (IE); Andrew T. Penrose, Castleknock (IE)

(73) Assignee: International Business Machines Corporation, Armonk, NY (US)

( * ) Notice: Subject to any disclaimer, the term of this patent is extended or adjusted under 35 U.S.C. 154(b) by 189 days.

(21) Appl. No.: 16/562,469

(22) Filed: Sep. 6, 2019

(65) Prior Publication Data

US 2021/0075679 A1    Mar. 11, 2021

(51) Int. Cl.
| | |
|---|---|
| *H04L 12/24* | (2006.01) |
| *G06F 16/35* | (2019.01) |
| *G06F 16/33* | (2019.01) |
| *G06F 16/84* | (2019.01) |
| *G06F 40/242* | (2020.01) |
| *G06F 40/295* | (2020.01) |

(52) U.S. Cl.
CPC ...... *H04L 41/0853* (2013.01); *G06F 16/3344* (2019.01); *G06F 16/353* (2019.01); *G06F 16/86* (2019.01); *G06F 40/242* (2020.01); *G06F 40/295* (2020.01)

(58) Field of Classification Search
CPC ... H04L 41/0853; G06F 16/353; G06F 16/86; G06F 16/3344; G06F 40/242; G06F 40/295

USPC .......................................................... 709/220
See application file for complete search history.

(56) References Cited

U.S. PATENT DOCUMENTS

| | | | |
|---|---|---|---|
| 7,200,548 B2 | 4/2007 | Courtney | |
| 2003/0046370 A1* | 3/2003 | Courtney | H04L 41/0853 709/220 |
| 2007/0260976 A1* | 11/2007 | Slein | G06F 40/143 |
| 2015/0127792 A1* | 5/2015 | Messinger | H04L 41/0843 709/221 |
| 2016/0026621 A1* | 1/2016 | Misra | G06F 40/30 704/9 |

(Continued)

OTHER PUBLICATIONS

IBM, "QRadar Architecture Overview", IBM Knowledge Center, Printed Jul. 15, 2019, 3 pages, <https://www.ibm.com/support/knowledgecenter/en/SS42VS_7.3.1/com.ibm.qradar.doc/c_qrm_ug_connections.html>.

(Continued)

*Primary Examiner* — James E Springer
(74) *Attorney, Agent, or Firm* — Edward J. Wixted, III

(57) ABSTRACT

In an approach for extracting natural language text from a native device configuration of a network device, a processor converts a native device configuration of a network device to a standard element document. A processor extracts natural language text from the standard element document based on a set of predefined expressions. A processor extracts named entities from the extracted natural language text, according to given categories, via named-entity recognition. A processor maps each of the extracted and categorized named entities to a respective network device, based on respective extraction origin.

20 Claims, 4 Drawing Sheets

(56) References Cited

U.S. PATENT DOCUMENTS

| | | | |
|---|---|---|---|
| 2017/0279829 A1 | 9/2017 | Vasseur et al. | |
| 2019/0132214 A1* | 5/2019 | Porras | H04L 41/147 |
| 2019/0141002 A1* | 5/2019 | Balasubramanian | G06F 40/30 |
| 2019/0149989 A1* | 5/2019 | Moriya | H04W 12/069 |
| | | | 726/6 |
| 2019/0182300 A1* | 6/2019 | Simotas | H04L 67/16 |
| 2019/0280944 A1* | 9/2019 | Bellini | H04L 41/22 |
| 2020/0137175 A1* | 4/2020 | Ganci, Jr | H04L 67/125 |
| 2021/0037067 A1* | 2/2021 | Lee | H04L 65/1059 |

OTHER PUBLICATIONS

Martinez, Anny, "An Ontology-Based Approach Toward the Configuralion of Heterogeneous Network Devices", A Thesis Presented to The Technical University of Catalonia In Fulfillment of The Requirements for The Degree of Doctor in Computer Science, Barcelona, Apr. 2015, 188 pages.

Wang et al., "Machine Learning for Networking: Workflow, Advances and Opportunities", IEEE Network, vol. 32, Issue 2, Mar.-Apr. 2018, pp. 92-99.

* cited by examiner

```
<StandardElementDocument >
  <core:systemName>example-cisco-1</core:systemName>
  <core:loginBanner>
    example-cisco-1 Southbank MPLS Provider Edge Router Cisco 3825
    You have accessed a Southbank test network device
    contact johnsmith@companyA.com if you require access details
    further information on: http://example.com/device-wiki-page
  </core:loginBanner>
  <core:osInfo>
    <core:fileName>flash:example-image-bin</core:fileName>
    <core:make>Cisco</core:make>
    <core:version>15.1(4)M10</core:version>
    <core:osType>IOS</core:osType>
  </core:osInfo>
  ...
  <interface>
      <adminStatus>up</adminStatus>
      <description>to example-cisco-2</description>
      <interfaceEthernet>
        <autoDuplex>false</autoDuplex>
        <encapsulation>ARPA</encapsulation>
        <macAddress>00-00-5E-00-53-00</macAddress>
        <operationalDuplex>full</operationalDuplex>
      </interfaceEthernet>
      <interfaceIp>
        <ipConfiguration>
           <ipAddress>172.20.2.82</ipAddress>
           <mask>30</mask>
           <precedence>1</precedence>
        </ipConfiguration>
      </interfaceIp>
  </interface>
  ...
</StandardElementDocument>
```

300

310 — (loginBanner content block)

```
example-cisco-1 >>> Southbank <<< MPLS Provider Edge Router Cisco 3825
You have accessed a >>> Southbank <<< test network device
contact >>> johnsmith@companyA.com <<< if you require access details
further information on:>>> http://example.com/device-wiki-page <<<
```

Fig. 4

```
"Location"{
    "Hursley": "172.21.23.10 , 172.21.23.11",
    "Southbank" : "172.21.23.12 , 172.23.23.13 , 172.21.23.14 , 172.21.23.15",
    "Manchester" : "172.22.20.10 , 172.22.20.11 , 172.22.20.12, 172.22.20.13 , 172.22.20.14"
}

"Contact Email"
{
    "jdoe@companyA.com": "172.22.20.10 , 172.22.20.11 , 172.22.20.12, 172.22.20.13 , 172.22.20.14",
    "johnsmith@companyA.com" : "172.21.23.12 , 172.23.23.13 , 172.21.23.14 , 172.21.23.15"
}

"Neighbour Device Information"
{
    "to example-cisco-2" : "172.21.23.12"
}
```

Fig. 5

```
"172.21.23.12"{
    "Location" : "Southbank",
    "Contact" : "johnsmith@companyA.com",
    "Neighbour Device Information": "to example-cisco-2"
}

"172.22.20.10"{
    "Location" : "Manchester",
    "Contact" : "jdoe@companyA.com"
}
```

Fig. 6

NATURAL LANGUAGE PROCESSING IN MODELING OF NETWORK DEVICE CONFIGURATIONS

TECHNICAL FIELD

The present invention relates generally to the field of network device configurations, and more particularly to extracting natural language text from a native device configuration of a network device that is a part of a given network.

BACKGROUND

For the inclusion of a device in a network provided by a given network vendor, the device is accordingly configured by a network engineer to comprise any configuration information that is needed for the device to be added to that network. Such configuration information includes, but is not limited to, device interface specification(s), routing, access control rules and so forth. A device that is incorporated into a network is hereinafter referred to as a network device and may be a computer.

When configuring a device for inclusion in a given network, contextual information may also be added by a network engineer. Such contextual information is typically provided in natural language text, i.e., in free, unstructured text format. The contextual information may include: device location, contact information, references to internal documentation repositories, associations to neighboring network object(s), business purpose(s) of the device, Virtual Local Area Network (VLAN) information regarding a department, interfaces with Internet Protocol (IP) addresses that have been assigned statically or dynamically.

Network modeling tools are used for monitoring device configurations, simulating changes to a given network environment, and prioritizing risks and vulnerabilities in a given network.

SUMMARY

Aspects of an embodiment of the present invention disclose a method, computer program product, and computer system for extracting natural language text from a native device configuration of a network device. A processor converts a native device configuration of a network device to a standard element document. A processor extracts natural language text from the standard element document based on a set of predefined expressions. A processor extracts named entities from the extracted natural language text, according to given categories, via named-entity recognition. A processor maps each of the extracted and categorized named entities to a respective network device, based on respective extraction origin.

BRIEF DESCRIPTION OF THE DRAWINGS

FIG. 3 depicts an example of a snippet of a resulting XML from within a Standard Element Document that is produced from a native device configuration, in accordance with one embodiment of the present invention.

FIG. 4 depicts an example of extracted named entities from the example depicted in FIG. 3, in accordance with one embodiment of the present invention.

FIG. 5 depicts an example group of mapped named entities, in accordance with one embodiment of the present invention.

FIG. 6 depicts an example set of groupings, in accordance with one embodiment of the present invention.

DETAILED DESCRIPTION

Figure 1:
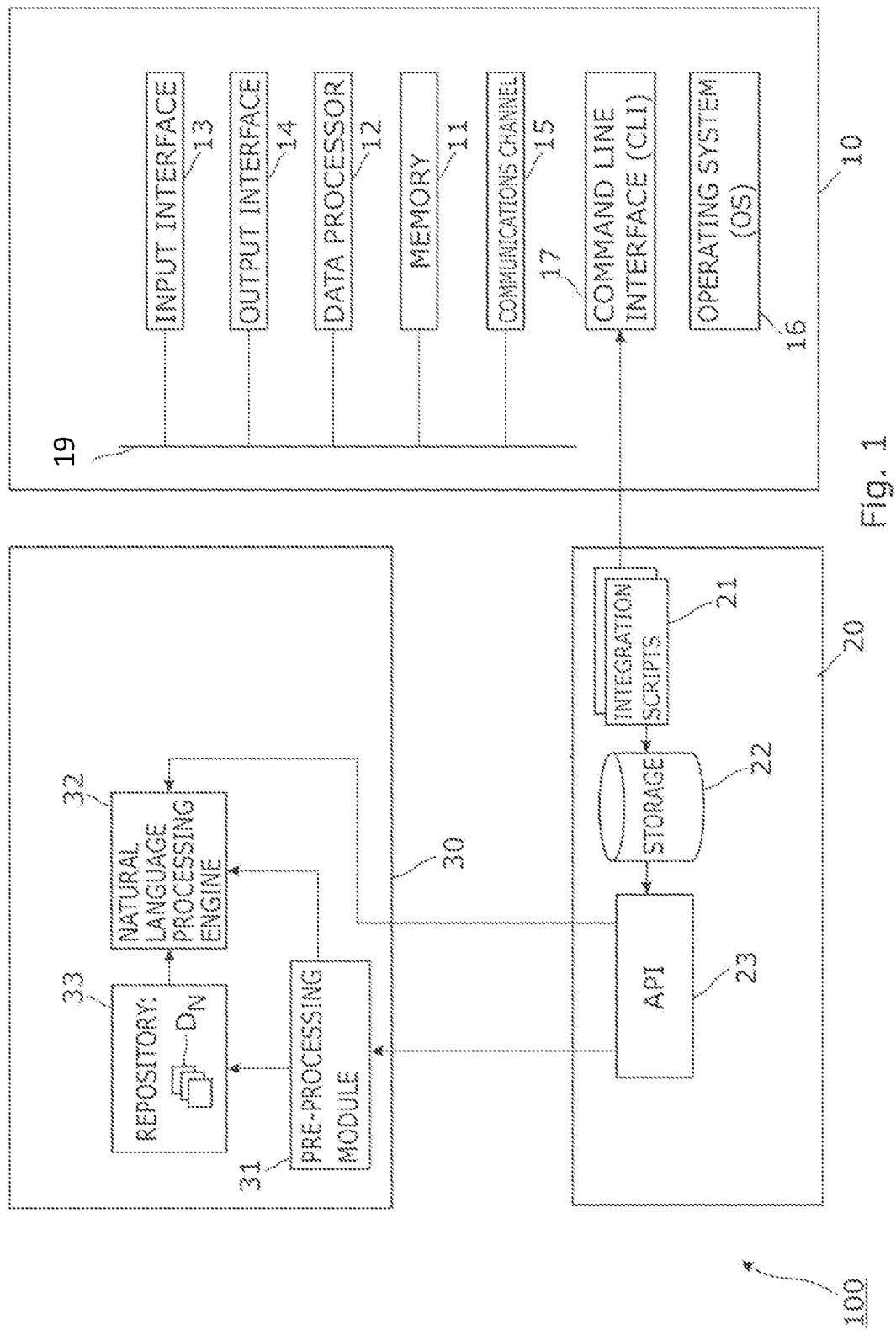
FIG. 1 depicts a diagram of a computing environment, in accordance with one embodiment of the present invention.

Within the description, the same reference numerals or signs are used to denote the same parts or the like. The reference numerals are not indicative of any order of importance and/or sequence of operation in respect of parts of any given embodiment of the present invention.

Embodiments of the present invention recognize that existing techniques of modeling network device configurations are schema based, and can perform pattern matching in order to extract sections of a native device configuration that fit a particular section of the schema. However, in such existing techniques, natural language and other unstructured text is either dropped or not processed in the network device configuration modeling. Embodiments of the present invention recognize that, by processing natural language contextual information, valuable supplementary information may be gathered on a network device, such as the network device's interaction with other network devices in the same or other network(s), which may be additionally used to provide an overview of a number of network devices in a given network. Thus, whilst the contextual information is peripheral, the contextual information may be useful in building up expansive knowledge on: network devices in a network, the interaction between network devices in the network with other devices outside the network, and on the network itself. Contextual information may include, for example, device location, contact information, references to internal documentation repositories, associations to neighboring network object(s), business purpose(s) of the device, Virtual Local Area Network (VLAN) information regarding a department, interfaces with Internet Protocol (IP) addresses that have been assigned statically or dynamically.

Reference is now made to FIG. 1, which schematically illustrates an embodiment of a system 100 of the present invention that is implemented for extracting natural language text from a native device configuration of a network device that is a part of a given network. As can be seen from FIG. 1, an embodiment of the system 100 of the present invention comprises a network device 10, network modeling tool 20, and computing device 30.

The network device 10, an example of which may be a computer, has a hardware aspect comprising: (i) a memory 11 that is configurable to store at least an executable instruction and (ii) a data processor 12 that is operatively coupled to the memory 11 and configurable to execute any instruction that is received at the data processor 12 via input interface 13. An output interface 14 is also provided to facilitate display of any outputs generated during the operation of the system 100. A communications channel 15 is provided to facilitate communication with other externally provided devices. The communications channel 15 may comprise a communication medium that may, for example, generally be wireless or wired media. Operative coupling between the different parts of the hardware aspect of network device 10 may be performed by the use of bus 19, however, such coupling may also be performed in any other appropriate way within the scope of an embodiment of the present invention.

Network device 10 also comprises software aspects, such as an operating system (OS) 16 that may be downloaded on memory 11 and that is run on data processor 12, thereby to facilitate management of hardware and software resources of network device 10. Also shown as a component of network device 10 is Command Line Interface (CLI) 17, by way of which a network engineer, or other administrative user, may configure network device 10 so that network device 10 may be integrated into a given network. CLI 17 may be network vendor specific, so a different CLI 17 is used by a network engineer, or other administrative user, to integrate the network device 10 into different networks provided by respective network vendors. For example, where the network vendor is Cisco®, the configuration may be performed via a Cisco Internetwork Operating System (IOS).

The network modeling tool 20 may be implemented by software, and may be IBM® Security QRadar® Risk Manager in one embodiment of the present invention. IBM and QRadar are trademarks of International Business Machines Corporation in the United States and/or other countries. Also provided are integration scripts 21 that are derivable from storage 22 and that are used by the network modeling tool 20 to perform schema-based, pattern matching in respect of the native device configuration at CLI 17 of the network device 10, thereby to yield a standard element document. In an embodiment of the present invention, any standard element documents that are generated may be stored in the storage 22 and are accessible by at least an Application Programming Interface (API) 23 that is provided in respect of the network modeling tool 20.

A standard element document represents a network device configuration in a format that may be easily consumed and/or processed by a software application, such as the network modeling tool 20 in an embodiment of the present invention. A native device configuration of a given network device 10 may typically contain details such as the network interfaces on that network device, for example. A standard element document is in contrast to a native device configuration in that it may be processed with ease and/or searched by a software application/network modeling tool 20.

In an embodiment of the present invention, a standard element document may be a document in Extensible Markup Language (XML) format, which is created on a basis of generic device schema and that is used to represent a modelled network device. XML is a format that may be processed with ease by given network modeling tools 20, such as IBM Security QRadar Risk Manager. This is because XML documents follow a relatively fixed structure, for example, a node that will have opening and closing tags to mark the beginning and end of a block. In a native device configuration, which is unstructured, there are no rules for the structure and configuration text may span multiple lines with no clear marker indicating where a block of configuration text ends and begins. An embodiment of the present invention is, of course, not limited to such use of XML format for the standard element document and other formats may be used that serve substantially the same purpose, that is, that they may be processed with relative ease by a given network modeling tool 20. In this regard, Javascript™ Object Notation (JSON) format is another format that may be used for a standard element document in an embodiment of the present invention. Java and all Java-based trademarks and logos are trademarks or registered trademarks of Oracle and/or its affiliates.

With respect to the network modeling tool 20 being implemented by way of IBM Security QRadar Risk Manager, the pattern-matching that is used for the conversion of a given native device configuration to a standard element document is done by parsing the native device configuration and extracting those parts that match a schema or part thereof. The extracted parts form the basis of the standard element document that is consequently generated. In respect of the schema, integration scripts comprising collections of keywords and/or parameters are used. In respect of a network device that is integrated into a network provided by a given network vendor, different integration scripts are used to perform the correct pattern matching based on each network vendor's CLI. By way of example, an interface in a typical Cisco IOS device could be parsed using an expression such as, "interface\s(\+)", where the capture group contains the interface name. In another example, in respect of Cisco IOS integration scripts held in IBM QRadar Risk Manager, parsing of the text of a given native device configuration based on CLI is done by performing schema-based, pattern-matching against the Cisco IOS integration scripts and those parts of the native device configuration that are successfully pattern-matched form the basis of an outputted XML format document.

The computing device 30 of an embodiment of the system aspect 100 may be implemented by software comprising: at least a pre-processing module 31, a natural language processing engine 32, and a repository 33. The API 23 of the network modeling tool 20 is operable to transmit standard element documents from storage 22 to the pre-processing module 31. The output of the API 23 is also used by the pre-processing module 31 to populate the repository 33 with dictionaries DN that include hostnames, IP addresses and so forth, which are known in a given network according to the network modeling tool 20. The natural language processing engine 32 is operably coupled to the API 23 in order to access normalized configuration information on a given network device.

Figure 2:
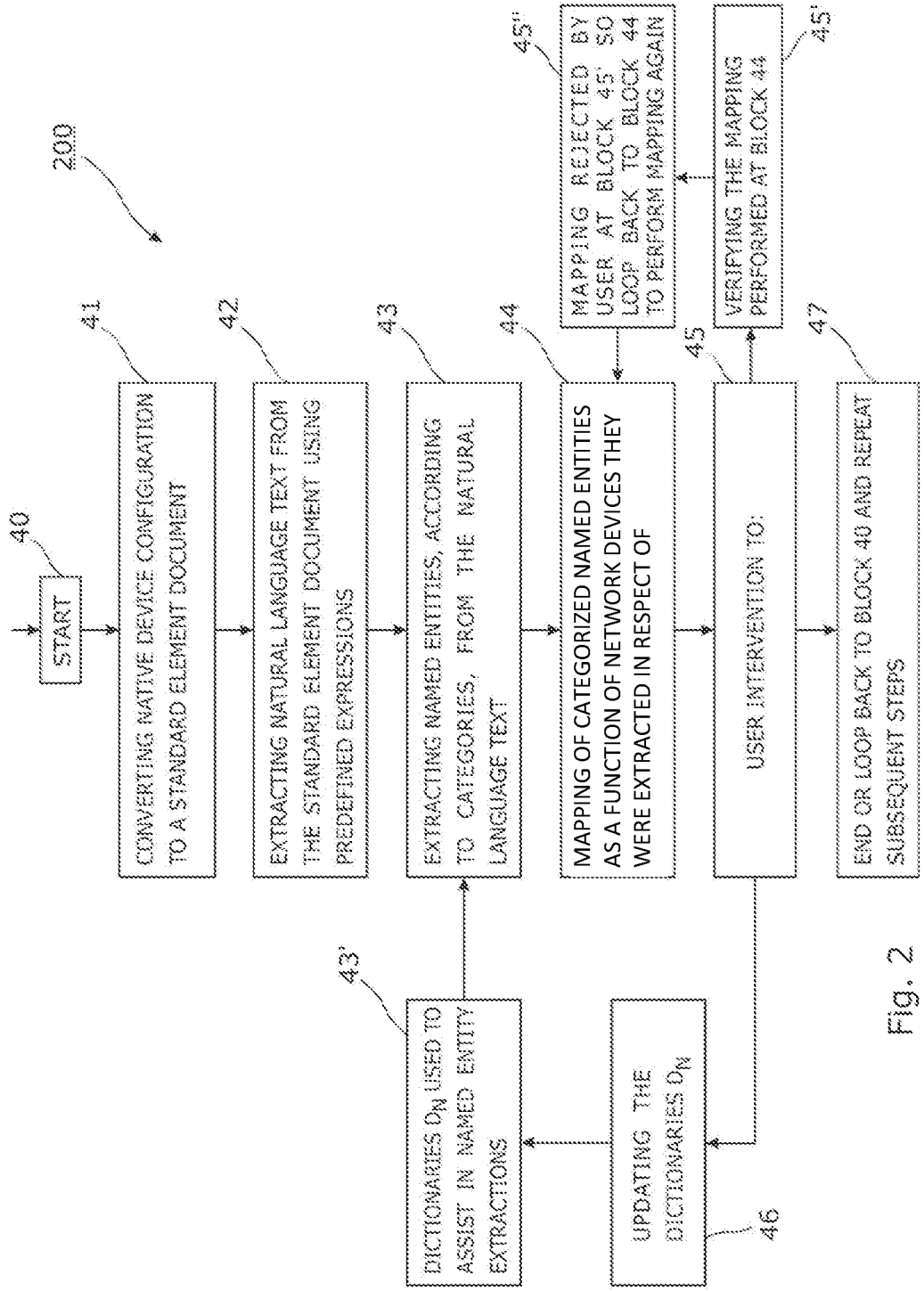
FIG. 2 depicts a flowchart of the steps of a program executing within the computing environment of FIG. 1, in accordance with one embodiment of the present invention.

Operation of an embodiment of the system 100 is described now in conjunction with an embodiment of a method aspect 200, which is shown in FIG. 2, starting at block 40.

At block 41, the native device configuration of a network device 10 is converted to a standard element document, this being facilitated by the network modeling tool 20 shown in FIG. 1. Such a conversion is performed using schema-based, pattern matching of the native device configuration of the network device 10 against integration scripts 21 of the network modeling tool 20. Those parts of the native device configuration that match an integration script 21, or a part thereof, are extracted and consequently output as a standard element document. Any standard element documents that are generated in this way are stored in the storage 22, pertaining to network modeling tool 20, and are transmitted to the API 23 for onwards transmittal to the pre-processing module 31 of the computing device 30 shown in FIG. 1. In one embodiment of the present invention, for the network modeling tool 20, IBM Security QRadar Risk Manager is used and the native device configuration of a given network device 10 is converted to a XML format, standard element document.

Proceeding to block 42 of FIG. 2, the pre-processing module 31 shown in FIG. 1 is operable to access a standard element document generated at block 41, in respect of a given network device 10, and to extract natural language text from the standard element document on a basis of predefined expressions. This is in contrast to existing techniques, where natural language and other unstructured text is either dropped or not processed. So, in the case that the standard element document is in XML format, the pre-processing module 31 uses XML Path Language (XPath) expressions, such as login banner and interface descriptions, to extract the natural language text from the standard element document.

FIG. 1 depicts a part of a standard element document that may typically be produced at block 41 of an embodiment of the method aspect 200 of the present invention. FIG. 3 depicts an example 300 of a snippet of a resulting XML from within a Standard Element Document that is produced from a native device configuration. FIG. 3 includes natural language text 310 that is extracted by the pre-processing module 31 at block 42 of an embodiment of the method aspect 200 of the present invention. Natural language text 310 is the text encompassed between <core:loginBanner> and </core:loginBanner> as depicted in FIG. 3. As can be clearly seen from the example in FIG. 3, the extracted natural language text pertains to a predefined XPath expression, namely, /StandardElementDocument/core:loginBanner.

At block 43 of FIG. 2, the natural language text that was extracted at block 42 by the pre-processing module 31 is made accessible to the natural language processing engine 32 shown in FIG. 1, which is operable to process the extracted natural language text to extract named entities therefrom, according to given categories, using named-entity recognition. In an embodiment of the present invention, a named entity may, for example, comprise at least one of: a given location, email address, reference to at least another known network device and internal URL, and so forth, and is categorized accordingly.

In order to broaden the capture of different types of named entities at block 43, and as denoted by block 43', dictionaries $D_N$ stored in repository 33 shown in FIG. 1 are additionally made available to the natural language processing engine 32 to supplement the named-entity recognition at block 43. In this way, named entities that may not be a part of a default configuration and/or named-entity directories of the natural language processing engine 32, for example, other network device host-names, may still be captured and extracted at block 43. The repository 33 is populated with the dictionaries $D_N$ by the pre-processing module 31 using the output of API 23 of the network modeling tool 20 in an embodiment of the present invention.

By way of example, and linking the action taken at block 43 in FIG. 2 to the example shown in FIG. 3, the natural language processing engine 32 is operable to use named-entity recognition, thereby to extract named entities from the natural language text extracted by the pre-processing module 31. For ease of reference, the named entities that are extracted are depicted in example 400 of FIG. 4 and encompassed between ">>>" and "<<<".

The named entities that are extracted by the natural language processing engine 32 are organized into different categories at block 43. So, with reference to the named entities that were extracted in reference to the example in FIG. 3, they are organized into the categories of: location (Southbank); email address (johnsmith@companyA.com), and internal URL (http://example.com/device-wiki-page).

At block 44 in FIG. 2, the natural language processing engine 32 is operable to facilitate mapping of each categorized named entity to a corresponding network device 10 in respect from where it was extracted. At block 44, in one embodiment of the present invention, key-value pairs are generated, with a key in each key-value pair being the categorized named entity that is mapped to a pair aspect, which is an IP address of a network device 10. Key-value pairs that are thus generated from the natural language processing engine 32 are outputted in JSON format in an embodiment of the present invention.

Additionally, the natural language processing engine 32 may be operable at block 44 to group the mapped named entities according to their respective categories as shown in FIG. 5. FIG. 5 depicts an example 500 grouping of the mapped named entities extracted by the natural language processing engine 32, according to category. For example, the mapped named entities may be grouped under location, email address, neighboring network device, and so forth, and/or in respect of correspondent network devices 10 as shown in FIG. 5, so the categorized named entities that were extracted at block 43 in respect of a network device 10 are listed under the IP address of that correspondent network device 10.

FIG. 6 depicts an example 600 of groupings according to IP addresses of network devices, such as network device 10.

Proceeding to block 45, opportunity is provided for human/user intervention in an embodiment of the present invention. For example, the mappings of the natural language text may be presented to a user. One such opportunity for human/user intervention occurs at block 45', where a user may verify whether the mapping at block 44 has been performed with relative accuracy on a basis of their pre-existing knowledge. Such pre-existing knowledge may comprise: the knowledge that a network operator may have on given network devices 10 belonging to a specific location, according to the IP addresses of those devices, or where the network operator is able to derive such knowledge from elsewhere. Such knowledge is then used by the network operator, at block 45', in order to verify/validate the mappings performed by the natural language processing engine 32 at block 44. Thus, a user is provided with a platform for either approving or rejecting the mappings in the User Interface of the computing device 30 at block 45'. If a given mapping is rejected by a user at block 45', an embodiment of the present invention is progressed to block 45" so that the natural language processing engine 32 is provided with such feedback in that its latest output was not accurate. A loop is then made back to block 44 in order to cause the natural language processing engine 32 to perform the mapping again.

Another opportunity for human intervention is that an embodiment of the present invention may be progressed from block 45 to block 46 where a user may provide given nomenclature for addition to the dictionaries $D_N$ of block 43', which are used for contextual assistance in the named-entity recognition performed at block 44 by the natural language processing engine 32. In this way, a probability of the natural language processing engine 32 recognizing and extracting named-entities is increased. Block 46 also provides an opportunity for a user to update the dictionaries $D_N$ with any results of the verification that is done at block 45'.

Block 47 marks the end of an embodiment of the method aspect 200 of the present invention. Alternatively, a loop may be performed back to block 40 after and/or over a predefined period of time.

In an embodiment of the present invention, the JSON data output from the natural language processing engine 32 may be displayed by an IBM Security QRadar application to provide, for example, a list of top 5 locations or top 5 administrative contact email addresses that have been identified in a given network.

Alternatively, the existing IBM Security QRadar Risk Manager User Interface will parse the JSON data to display metadata in respect of a network device 10 on existing Configuration Monitor screens of IBM Security QRadar Risk Manager, which are provided in respect to the network modeling tool 20, shown in FIG. 1.

Natural Language Generation according to an embodiment of the present invention may be used in conjunction with a normalized configuration produced by IBM Security QRadar Risk Manager to construct a summary paragraph about a network device 10. For example, given the JSON output Depicted in FIGS. 5 and 6, this might produce the following for network device 10 having the IP address 172.21.23.12:

This Cisco IOS router has 59 access control lists. The device has the following routing protocols enabled; static, RIP and OSPF. The device is connected to the internet via edge gateway INTERNET-ROUTER. The device is managed by johnsmith@companyA.com. The device is part of the production network.

This device summary may be used by a network operator to get a relatively quick overview of a network device 10 in IBM Security QRadar Risk Manager without needing to investigate the normalized configuration. From the summary above they would know which routing protocols are enabled on the network device 10, if it is connected to the Internet and who to contact for any requests or issues with that network device 10.

An embodiment of the present invention may be used in conjunction with network modeling tools to enhance the modeling of network device configurations by facilitating the capture and processing of natural language text that may provide contextual information in respect of a network device that is a part of a given network.

The present invention may be a system, a method and/or a computer program product at any possible technical level of integration. The computer program product may include a computer readable storage medium (or media) having computer readable program instructions thereon for causing a processor to carry out the aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g. light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable storage instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages including an object oriented programming language such as Smalltalk, C++, or the like, and procedural programming languages, such as the "C" programming language or similar programming languages. The computer readable program instructions may execute entirely on the user's computer, partly on the user's computer, as a standalone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems) and computer program products according to embodiments of the present invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the function/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In any of the above aspects, the various features may be implemented in hardware or as software modules running on one or more data processors.

The present invention has been described above purely by way of example and modifications of detail can be made within the scope of the present invention.

Each feature disclosed in the description, and where appropriate, the claims and/or the drawings may be provided independently or in any appropriate combination.

What is claimed is:

1. A computer-implemented method for extracting natural language text from a native device configuration of a network device, the computer-implemented method comprising:
    converting, by one or more processors, a native device configuration of a network device to a standard element document;
    extracting, by one or more processors, natural language text from the standard element document based on a set of predefined expressions;
    extracting, by one or more processors, named entities from the extracted natural language text, according to given categories, via named-entity recognition; and
    mapping, by one or more processors, each of the extracted and categorized named entities to a respective network device, based on respective extraction origin.

2. The computer-implemented method of claim 1, wherein the standard element document is in Extensible Markup Language (XML) format that includes structure based on a schema.

3. The computer-implemented method of claim 2, further comprising:

extracting, by one or more processors, the natural language text from the standard element document utilizing XML Path Language (XPath) expressions.

4. The computer-implemented method of claim 1, further comprising:
    accessing, by one or more processors, dictionaries to perform the named-entity recognition; and
    receiving, by one or more processors, an update to the dictionaries subsequent to a verification of the mapping of the extracted and categorized named entities.

5. The computer-implemented method of claim 1, wherein each named entity includes a selection from the group consisting of: given location, email address, reference to another network device, and internal Uniform Resource Locator (URL).

6. The computer-implemented method of claim 1, further comprising:
    grouping, by one or more processors, mapped named entities according to a selection from the group consisting of: corresponding category and corresponding network device.

7. The computer-implemented method of claim 1, further comprising:
    responsive to receiving a verification of the mapping of each of the extracted and categorized named entities, confirming the mapping.

8. A computer program product for extracting natural language text from a native device configuration of a network device, the computer program product comprising:
    one or more computer readable storage media and program instructions stored on the one or more computer readable storage media, the program instructions comprising:
    program instructions to convert a native device configuration of a network device to a standard element document;
    program instructions to extract natural language text from the standard element document based on a set of predefined expressions;
    program instructions to extract named entities from the extracted natural language text, according to given categories, via named-entity recognition; and
    program instructions to map each of the extracted and categorized named entities to a respective network device, based on respective extraction origin.

9. The computer program product of claim 8, wherein the standard element document is in Extensible Markup Language (XML) format that includes structure based on a schema.

10. The computer program product of claim 9, further comprising:
    program instructions, stored on the one or more computer readable storage media, to extract the natural language text from the standard element document utilizing XML Path Language (XPath) expressions.

11. The computer program product of claim 8, further comprising:
    program instructions, stored on the one or more computer readable storage media, to access dictionaries to perform the named-entity recognition; and
    program instructions, stored on the one or more computer readable storage media, to receive an update to the dictionaries subsequent to a verification of the mapping of the extracted and categorized named entities.

12. The computer program product of claim 8, wherein each named entity includes a selection from the group consisting of: given location, email address, reference to another network device, and internal Uniform Resource Locator (URL).

13. The computer program product of claim 8, further comprising:
    program instructions, stored on the one or more computer readable storage media, to group mapped named entities according to a selection from the group consisting of: corresponding category and corresponding network device.

14. The computer program product of claim 8, further comprising:
    program instructions, stored on the one or more computer readable storage media, to responsive to receiving a verification of the mapping of each of the extracted and categorized named entities, confirm the mapping.

15. A computer system for extracting natural language text from a native device configuration of a network device, the computer system comprising:
    a processor;
    a tangible, computer readable memory for storing program instructions which when executed by the processor performs the steps of:
    converting a native device configuration of a network device to a standard element document;
    extracting natural language text from the standard element document based on a set of predefined expressions;
    extracting named entities from the extracted natural language text, according to given categories, via named-entity recognition; and
    mapping each of the extracted and categorized named entities to a respective network device, based on respective extraction origin.

16. The computer system of claim 15, wherein the standard element document is in Extensible Markup Language (XML) format that includes structure based on a schema.

17. The computer system of claim 16, further comprising:
    extracting the natural language text from the standard element document utilizing XML Path Language (XPath) expressions.

18. The computer system of claim 15, further comprising:
    accessing dictionaries to perform the named-entity recognition; and
    receiving an update to the dictionaries subsequent to a verification of the mapping of the extracted and categorized named entities.

19. The computer system of claim 15, wherein each named entity includes a selection from the group consisting of: given location, email address, reference to another network device, and internal Uniform Resource Locator (URL).

20. The computer system of claim 15, further comprising:
    grouping mapped named entities according to a selection from the group consisting of:
    corresponding category and corresponding network device.

\* \* \* \* \*